US008508958B2

(12) United States Patent
Orr et al.

(10) Patent No.: US 8,508,958 B2
(45) Date of Patent: Aug. 13, 2013

(54) LLC CONTROLLER WITH PROGRAMMABLE FRACTIONAL BURST FREQUENCY

(75) Inventors: Raymond K. Orr, Kanata (CA); Hartley F. Horwitz, Ottawa (CA); Paul W. DeMone, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 319 days.

(21) Appl. No.: 13/078,768

(22) Filed: Apr. 1, 2011

(65) Prior Publication Data

US 2012/0250360 A1    Oct. 4, 2012

(51) Int. Cl.
*H02M 3/335*    (2006.01)

(52) U.S. Cl.
USPC ........................................................ 363/21.02

(58) Field of Classification Search
USPC .......... 363/21.02, 21.03, 21.04, 21.07, 21.08, 363/21.1
See application file for complete search history.

(56) References Cited

U.S. PATENT DOCUMENTS

| | | | | |
|---|---|---|---|---|
| 6,018,467 A | * | 1/2000 | Majid et al. | 363/16 |
| 6,069,804 A | * | 5/2000 | Ingman et al. | 363/21.14 |
| 7,313,004 B1 | * | 12/2007 | Yang et al. | 363/21.02 |
| 7,733,669 B2 | | 6/2010 | Jiao et al. | |
| 8,031,493 B2 | * | 10/2011 | Huang et al. | 363/21.18 |
| 8,279,627 B2 | * | 10/2012 | Baurle et al. | 363/16 |
| 2008/0198638 A1 | * | 8/2008 | Reinberger et al. | 363/74 |
| 2012/0127761 A1 | * | 5/2012 | Halberstadt et al. | 363/21.02 |

OTHER PUBLICATIONS

Wang et al., "Analysis and Implementation of LLC Burst Mode for Light Load Efficiency Improvement," Twenty-Fourth Annual IEEE, Applied Power Electronics Conference and Exposition Delta Power Electronics Center, Mar. 2009, pp. 58-64.
STMicroelectronics, "AN2644 Application Note, an introduction to LLC resonant half-bridge converter," Sep. 2008, pp. 1-64.

* cited by examiner

*Primary Examiner* — Timothy J Dole
*Assistant Examiner* — Ivan Laboy Andino
(74) *Attorney, Agent, or Firm* — Blakely Sokoloff Taylor & Zafman LLP (57) ABSTRACT

A controller for use in an LLC resonant converter is disclosed. An example controller is controlled by detecting a maximum frequency signal to set a maximum switching frequency of the LLC resonant converter. A burst stop frequency and a burst start frequency are programmed in response to the maximum switching frequency. The burst stop frequency and the burst start frequency are fractions of the maximum switching frequency. The LLC resonant converter is switched in response to a feedback signal to regulate an output of the LLC resonant converter. The steps of switching the LLC resonant converter in a burst mode in response to the feedback signal reaching a value corresponding to the programmed burst start frequency and of stopping the switching of the LLC resonant converter in the burst mode in response to the feedback signal reaching a value corresponding to the programmed burst stop frequency are repeated.

30 Claims, 7 Drawing Sheets

LLC CONTROLLER WITH PROGRAMMABLE FRACTIONAL BURST FREQUENCY

BACKGROUND INFORMATION

1. Field of the Disclosure

The present invention relates generally to power supplies, and in particular but not exclusively, relates to controllers for switched mode power supplies.

2. Background

Switch mode power supplies are used in a wide variety of household or industrial appliances that require a regulated direct current (dc) voltage for their operation. There are a wide variety of known dc-dc converter topologies using PWM (pulse width modulation) or PFM (pulse frequency modulation) control to regulate output voltage.

One type of dc-dc converter topology is a resonant switched mode power converter. A resonant controller included in a resonant switched mode power converter controller with PFM utilizes resonant properties to provide natural soft switching in a closed loop to regulate the output. A resonant controller with PFM senses the power supply output and controls it by varying the switching frequency. An advantage of a resonant controller with PFM is that with the natural soft switching, there is reduced switching loss compared to non-resonant power converter topologies. Another advantage is that resonant controllers with PFM can be designed to operate with higher frequencies in a smaller package sizes.

Among a variety of resonant switched mode power converters are high frequency (HF) transformer isolated LLC converters, which have become increasingly popular in recent years. LLC resonant converters utilize the resonance between two inductors and a capacitor to provide natural soft switching. LLC resonant converters save on cost and size by utilizing the magnetizing and leakage inductance of the HF transformer as part of their resonance components. One disadvantage of some resonant converters is that the required wide range of frequency control result in more complicated electromagnetic interference (EMI) filter designs. However, with the gain characteristics of LLC resonant converters, output regulation can be achieved with a narrow band of frequency control.

To interface with low frequency (e.g. 60 or 50 Hz) alternating current (ac) networks, dc-dc LLC resonant converters require an ac-dc front stage. With continuing efforts to conserve energy, there are increasingly tighter obligatory standards for the overall efficiency, low load/no load and standby power consumption in power converters.

One known method for reducing power loss at low load and no load conditions in LLC resonant converters is by entering a mode of operation commonly known as "Burst Mode Control" by minimizing the switching activity and the power consumption during the low load and no load conditions. However, known LLC resonant converters having a burst mode control operation use the maximum operating frequency, which happens at lowest possible load, as the burst frequency, which results in a higher switching loss and result in the power converter not being in compliance with the tight values required by regulatory enforcement agencies for no load/standby power consumption.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing an LLC resonant controller with programmable fractional burst frequency are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As will be discussed, an LLC resonant controller feedback structure with a programmable fractional burst frequency is disclosed. In the illustrated examples, the burst start frequency, Fstart, and the burst stop frequency, Fstop, are independently programmable to be fractions of a maximum switching frequency of the LLC resonant controller. A user through the utilization of external components and/or internal registers can accurately program the thresholds of the load levels in a burst mode that switching starts and stops. In one example, a reduced burst frequency may be programmed to reduce no load/standby power loss to enable regulatory compliance. In addition, an existing pin such as for example a maximum frequency pin may be used for the additional function of programming the Fstart and Fstop burst frequencies, which eliminates the need of adding any extra pins. As a result, examples of the presently disclosed LLC resonant converter controller with programmable fractional burst start and stop frequencies Fstart and Fstop make possible a simple and flexible LLC resonant converter design with higher efficiency and reduced no/low load loss in accordance with the teachings of the present invention.

It is noted that the specific of features, pins and components for an LLC resonant controller with programmable fractional burst start and stop frequencies Fstart and Fstop are provided for explanation purposes and have been selected to clarify basic operation of an LLC resonant controller featuring programmable fractional burst frequencies in accordance with the teachings of the present invention. It is appreciated that the specific features described are not intended to limit or exclude other pins and other features in other example LLC resonant controllers in accordance with the teachings of the application.

Figure 1:
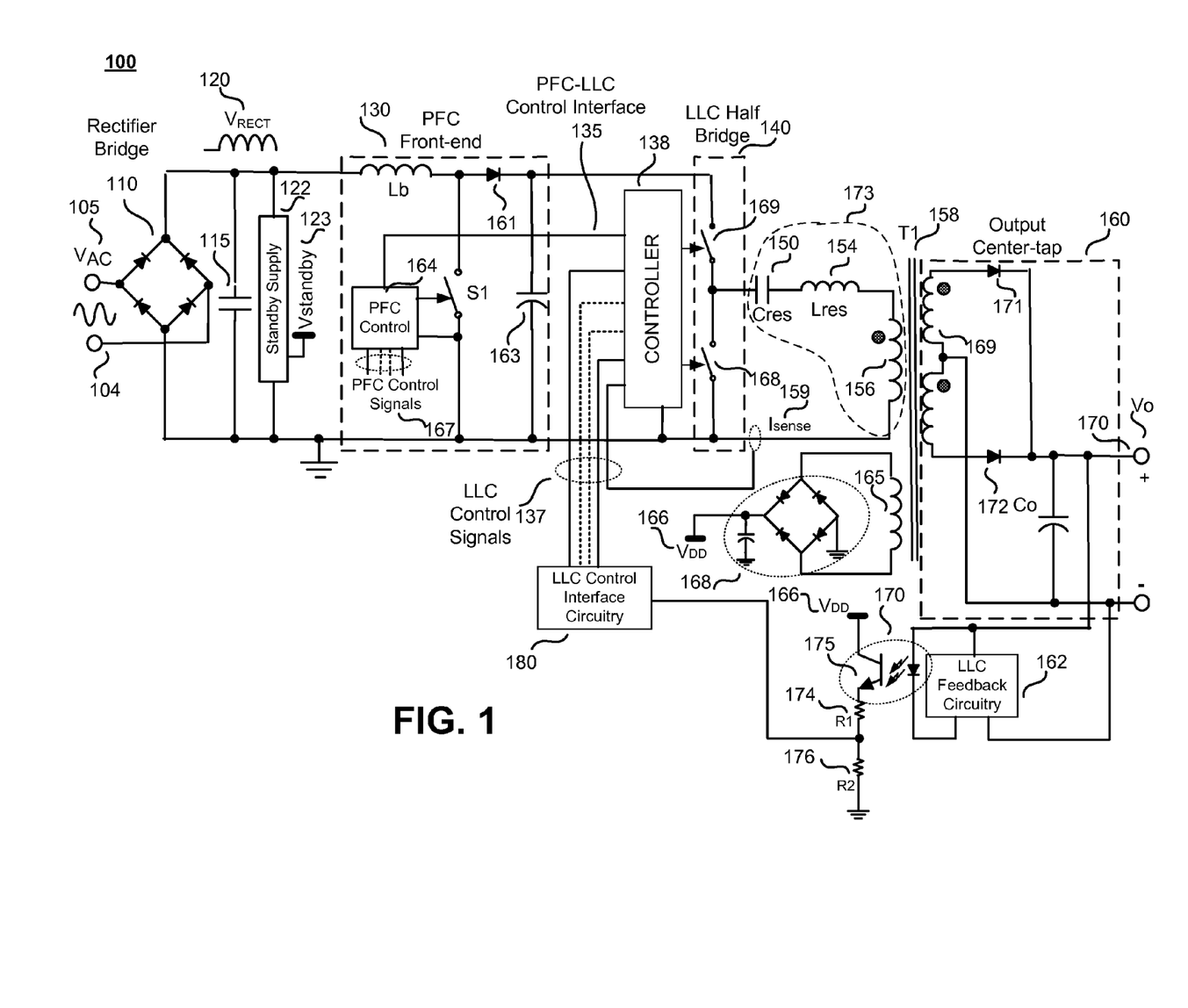
FIG. 1 is a schematic illustrating one example of a power converter utilizing a simplified cascaded PFC front stage and LLC resonant converter in accordance with the teachings of the present invention.

To illustrate, FIG. 1 shows one example of a power converter 100 including an LLC resonant converter with a programmable burst frequency in accordance with the teachings of the present invention. As shown in the depicted example, a front stage ac-dc boost converter is included, which improves power factor (PF) at the ac interface and provides a regulated dc voltage to the input of LLC half bridge 140. The power converter 100 includes a rectifier bridge 110 coupled to receive VAC 105 at input 104 and generate a rectified output VRECT 120 across a capacitor 115. A standby supply 122 is coupled across capacitor 122 and is coupled to generate a standby voltage Vstandby 123. As shown in the depicted example, a PFC front-end circuit 130 is coupled to receive VRECT 120 from capacitor 115 to provide power factor correction.

In the illustrated example, PFC front-end circuit 130 includes and inductor Lb coupled to capacitor 115 and rectifier bridge 110. Switch S1 and diode 161 are coupled to inductor Lb, and capacitor 163 is coupled to diode 161 as shown. In the illustrated example, Switch S1 is switched in response to the control of PFC control circuit 164, which is coupled to receive PFC control signals 167.

A controller 138 is coupled to the PFC control circuit 164 through PFC-LLC control interface 135. In one example, controller 138 is an LLC resonant controller with programmable burst frequencies that is coupled to receive LLC control signals 137 from LLC control interface circuitry 180 to control the switching of the switches 169 and 168 of LLC half bridge 140. In addition, controller 138 is coupled to receive a current sense signal Isense 159, which is representative of a current through the primary winding 156. As shown, an LLC resonant circuit 173, which includes a capacitor Cres 150, an inductor Lres 154 and energy transfer element T1 158 with the leakage and magnetic inductance, is coupled to LLC half bridge circuit 140.

As illustrated in FIG. 1, example power converter 100 also includes an output circuit 160, which generates an output voltage Vo at output 170 across filter capacitor Co from a center-tapped secondary winding 169 of energy transfer element T1 158. In the illustrated example, LLC feedback circuitry 162 and optocoupler 170 are coupled to the output 170 of power converter 100. Phototransistor 175 of optocoupler 170 is coupled to a voltage divider provided with resistors R1 174 and R2 176. As shown in the depicted example, voltage VDD 166 is provided to a collector of phototransistor 175 from an auxiliary winding circuit 165 including a full-wave rectifier and capacitor as shown coupled to an auxiliary winding 165 of energy transfer element T1 158. A feedback signal representative of output voltage Vo is generated at a node between resistors R1 174 and R2 176. The feedback signal is provided to LLC control interface circuitry 180 to generate the LLC control signals 137 that are coupled to be received by the controller 138.

In operation, controller 138 creates complementary non-overlapping switching signals with variable frequency that drives the switches 169 and 168 in the LLC half bridge 140. In various examples, controller 138 can support both half bridge, such as for example LLC half bridge 140, or full bridge topologies for power converter 100. In one example, a full bridge configuration may be utilized in high power applications and would enjoy similar benefits in accordance with the teachings of the present invention. In the half bridge configuration example shown in FIG. 1, switches 169 and 168 of LLC half bridge 140 are coupled to LLC resonant circuit 173. In operation, switches 169 and 168 of LLC half bridge 140 are controlled by controller 138 to apply square wave voltage pulses to capacitor Cres 150 to result in sinusoidal resonant oscillations in the LLC resonant circuit 173. The sinusoidal resonance oscillations are applied to a high frequency power transformer, such as for example energy transfer element T1 158, and are transferred to output circuit 160.

In the illustrated example, the center-tap configuration of the secondary winding 169 and ac oscillations through two diode rectifiers 171 and 172 and filter capacitor Co create a regulated dc output voltage Vo, which may be utilized for example to power a load coupled to the output 170 of the power converter 100. In the illustrated example, energy transfer element T1 158 serves to transfer energy as well as provide galvanic isolation between input 104 and output 170 of power converter 170. To save on board cost, size, weight and component count, the leakage and magnetizing inductance of the energy transfer element T1 158 are often utilized as part of resonance components of the LLC resonant circuit 173.

The LLC resonant circuit 173 of FIG. 1 has two resonant frequencies: the series resonant frequency that is based on the inductance of inductor Lres 154, which may be realized entirely or partially by the leakage inductance of T1 158, and the capacitance of capacitor Cres 150; and the parallel resonance frequency that is based on inductance of inductor Lres 154, the capacitance of capacitor Cres 150, and the leakage and magnetizing inductance of energy transfer element T1 158, which will be referred to as Lp. Typically an LLC resonant circuit 173 is designed to operate above the parallel resonant frequencies. In this range, the gain of the circuit is negative, meaning that an increase in frequency decreases the energy transferred to the output 170. In this region of operation, the power train appears as inductive. The half bridge current of LLC half bridge 140 lags the LLC resonant circuit 173 input voltage due to the inductive nature of the LLC resonant circuit 173. An advantage of lagging current is that before switch 168 or switch 169 turns on, the negative current discharges the drain-source capacitance and passes through the anti parallel diode (i.e., the body diode) of the MOSFET bringing voltage across the switch to zero and eliminating the switch turn on loss that is known as zero voltage switching (ZVS).

In the example shown in FIG. 1, the rectifier diodes 171 and 172 in output circuit 160 also have a region of operation where the current decays to zero and eliminates the reverse recovery loss as seen in other power converter topologies.

Typically, LLC resonant circuit 173 of power converter 100 is operated within an appropriate frequency range (between a minimum frequency FMIN and a maximum frequency FMAX) to reduce losses.

Thus, it is appreciated that the above-described elimination of switch turn on loss and elimination of reverse recovery loss are benefits of the LLC resonant converter topology of power converter 100. In a well designed LLC resonant circuit 173 operating in the proper region and in the normal mode of operation as described above, the LLC resonant circuit 173 frequency varies in a narrow range around the series resonant frequency.

However, as a load coupled to output 170 decreases, the resonant frequency increases, and voltage gain is reduced. By resonating at a higher frequency, less power is transferred to output circuit 160. If the load coupled to output 170 becomes very light or if there is no load, the resonance frequency continues to increase but the transfer characteristic slope flattens significantly. As the frequency of the LLC resonant circuit 173 increases to very high frequencies that are substantially greater than the series resonant frequency, large changes in frequency have very little impact on the power transfer. A consequence of this high frequency operation is that power MOSFETs and the inductors of power converter 100 may not operate properly or as efficiently at very high frequency. To prevent this very high frequency condition from occurring, the LLC resonant circuit of power converter 100 has a maximum frequency of operation (FMAX) in accordance with the teachings of the present invention. As will be discussed, in one example, the start and stop burst switching frequencies of controller 138 are programmed to be only a fraction of the maximum frequency in accordance with the teachings of the present invention.

Figure 2:
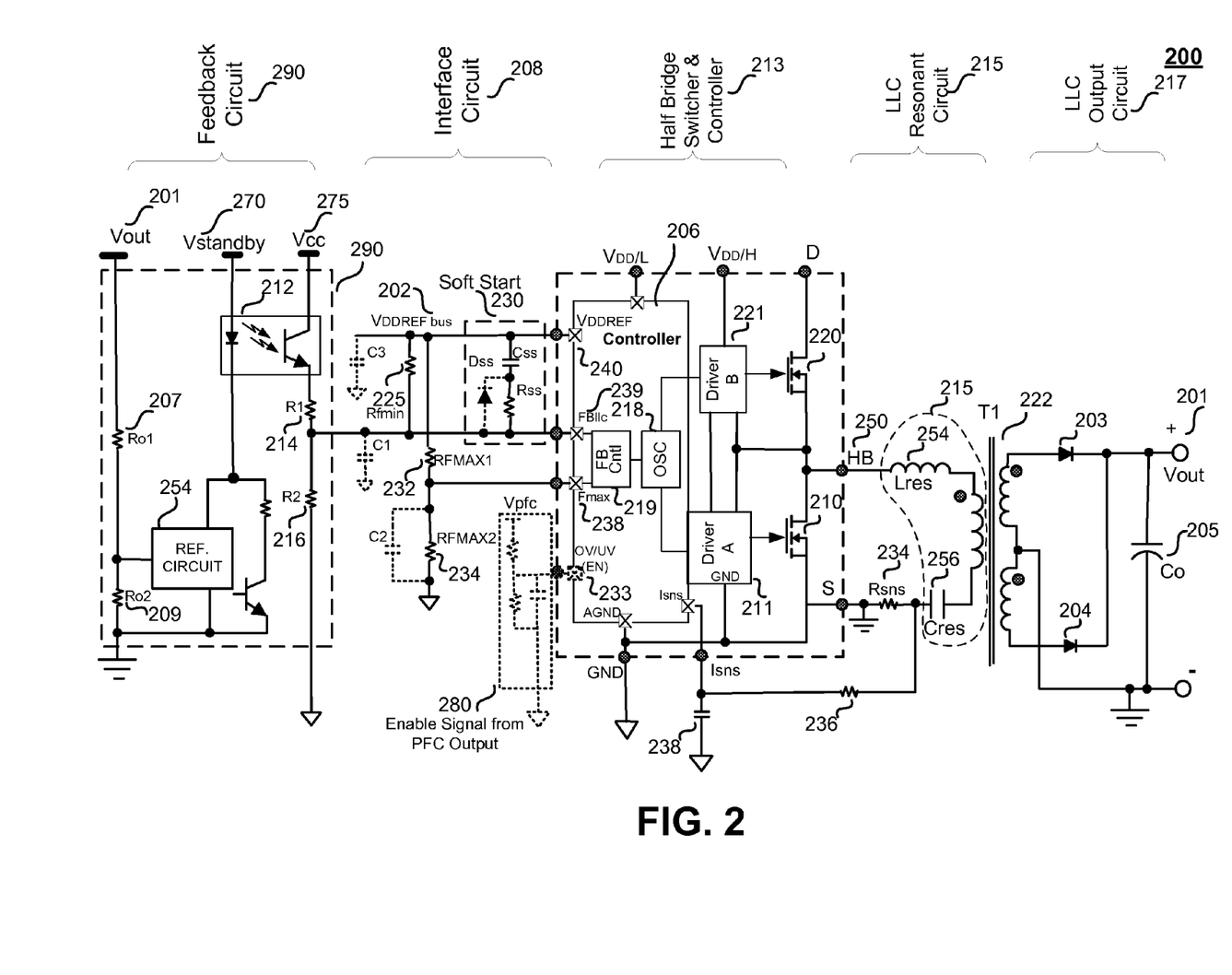
FIG. 2 is a schematic showing a more detailed circuit diagram of an example power converter utilizing a LLC resonant converter in accordance with the teachings of the present invention.

To illustrate, FIG. 2 is a schematic showing a more detailed circuit diagram of an example power converter 200 utilizing a LLC resonant circuit in accordance with the teachings of the present invention. As will be discussed, FIG. 2 shows an example application of an LLC converter circuit diagram with its power components and the interface circuitry of a controller having programmable burst frequencies, including a programmable burst start frequency, Fstart, and a programmable burst stop frequency, Fstop, which are fractions of the maximum switching frequency in accordance with the teachings of the present invention.

As shown in the depicted example, power converter 200 includes a feedback circuit 290 coupled to sense an output voltage Vout 201 from an LLC output circuit 217. A half bridge & LLC resonant controller stage 213 is coupled to receive a feedback signal from the feedback circuit 290 through an interface circuit 208. A controller 206 includes a feedback control circuit 219 and an internal oscillator 218 having a programmable burst start and stop frequencies that are controlled to drive the switching of switches 210 and 220 in the half bridge & LLC resonant controller stage 213, which generates oscillations in an LLC resonant circuit 215. In one example, controller 206 is an LLC resonant controller with programmable burst start and stop frequencies. In one example, the programmable burst start and stop frequencies are fractions of the maximum switching frequency of the LLC resonant converter. The oscillations in LLC resonant circuit 215 transfer power to the LLC output circuit 217 through an energy transfer element T1 222 as shown.

In operation, feedback circuit 290 senses the output voltage Vout 201 from LLC output circuit 217 of power converter 200. In one example, the output voltage Vout 201 is sensed through a resistor divider formed with resistor Ro1 207 and resistor Ro2 209, through a reference circuit 254 and an optocoupler 212, as shown. As shown in the depicted example, the LED of optocoupler 212 is coupled to receive power from Vstandby 270 and the phototransistor of optocoupler 212 is coupled to receive power from Vcc 275. In the illustrated example, the output feedback signal is generated from optocoupler 212 through a resistor divider formed with a resistor R1 214 and a resistor R2 216, through interface circuit 208, to a feedback pin FBllc 239 of controller 206.

As shown in the depicted example, the feedback pin FBllc 239 of controller 206 sinks current from external components, including the optocoupler 212, which provides a current that is proportional to the secondary side output voltage 201 of the LLC output circuit 217. In one example, the feedback control circuit 219 receives the feedback current from the feedback pin FBllc 239 and is coupled to the internal oscillator 218 of controller 206, which is a current-controlled oscillator. In one example, internal oscillator 218 generates complementary gating signals having a 50% duty cycle through driver A 211 and driver B 221 to switch switches 210 and 220, respectively. In one example, the frequencies at which switches 210 and 220 are switched are varied to regulate the output voltage 201 in accordance with the teachings of the present invention. In one example, as internal oscillator 218 receives more current from the feedback control circuit 219, the frequency of oscillation increases accordingly, which reduces the transfer of power to the LLC output circuit 217 of power controller 200.

In one example, a maximum frequency of oscillation of oscillator 218 is set with a resistor divider coupled to the FMAX pin 238 of the controller 206. As shown in the example illustrated in FIG. 2, the resistor divider is formed with a resistor RFMAX1 232 coupled between VDDREF bus 202 and an FMAX pin 238 of controller 206 and a resistor RFMAX2 234 coupled between the FMAX pin 238 and a primary side ground terminal. In the illustrated example, the VDDREF bus 202 is coupled to the VDDREF pin 240 of controller 206. In operation, resistor RFMAX1 232 limits the current to the internal oscillator 218 of controller 206 to set a maximum frequency. In the example, a pull up resistor RFMIN 225 coupled between VDDREF bus 202 and feedback pin FBllc 239 sets a minimum input current, which sets a minimum frequency. In the example, the minimum frequency is set to help keep the controller 206 operating above the parallel resonant frequency of the LLC resonant circuit 215 in accordance with the teachings of the present invention.

In one example, when power converter 200 is initially powered up or restarted, a soft start block 230 included in interface circuit 208 includes a capacitor Css that is initially charged to zero volts at startup. The frequency of oscillation of the internal oscillator 218 in controller 206 is remains high during soft start, which results in switches 220 and 210 being switched at a high frequency resulting in relatively little energy being transferred to LLC output circuit 217 during soft start. As capacitor Css is charged during startup, the frequency of oscillation of oscillator 218 gradually decreases, which gradually increases the power transferred to LLC output circuit 217. In one example, the timing and slope of the soft start feature is controlled using external components, such as resistor Rss, capacitor Css and an optional diode Dss coupled across resistor Rss, as shown in FIG. 2. In the example, optional diode Dss may be included to provide fast discharging of capacitor Css.

If no external soft start components are used, then the oscillation frequency of oscillator 218 rapidly decreases from the maximum frequency in several clock cycles to a frequency determined by controller 206 for regulation in response to feedback current received at a feedback pin IFBllc 239 of controller 206. In operation, soft start helps to reduce large currents drawn from the input. For example, if the input of power converter 200 coupled to an output of a PFC front-end boost converter, such as for example the PFC front-end 130 illustrated in FIG. 1, the soft start circuit 230 helps to prevent drainage of the PFC front-end boost converter hold-up capacitor while starting power converter 200 with heavy load.

In one example, an enable signal from PFC output 280 is coupled to be received by the controller 206 at an OV/UV (EN) pin 233 as shown. In one example, the OV/UV (EN) pin 233 may be used for enabling a threshold at the input of the controller 206 for the cascaded applications including a PFC front-end. In addition, the OV/UV (EN) pin 223 may also be utilized to support an over voltage/under voltage protection feature to protect against over voltage/under voltage fault conditions in the power converter 200 at an output of the PFC stage in accordance with the teachings of the present invention.

Figure 3:
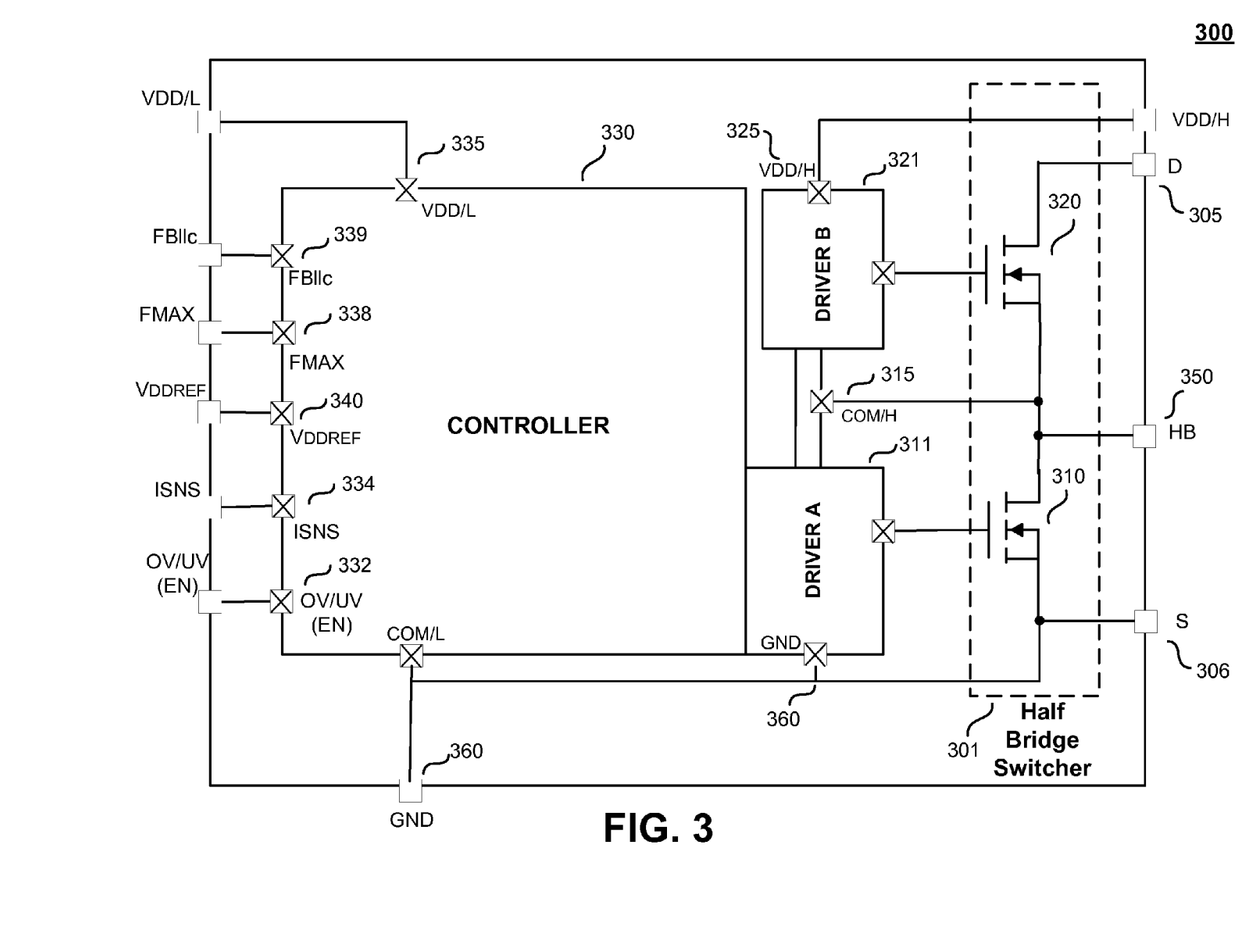
FIG. 3 shows an example of internal blocks of an example integrated circuit including an example controller with programmable fractional burst frequencies, a half bridge switcher, and drivers in accordance with the teachings of the present invention.

FIG. 3 shows an example of internal blocks of an example integrated circuit 300 including an example controller 330 with programmable burst frequencies, half bridge switcher, 301 and drivers 311 and 321 in accordance with the teachings of the present invention. In one example, integrated circuit 300 is a monolithic integrated circuit. In another example, integrated circuit 300 is a hybrid integrated circuit. As shown in the illustrated example, half bridge switcher includes a switch 310 coupled to be driven by driver A 311 and a switch 320 coupled to be driven by driver B 321. In the illustrated example, there is a midpoint HB 350 node between switches 310 and 320. It is appreciated that in various examples, switches 310 and 320 may be formed with switches that are external to the controller 330, or with internal switches that are integrated into integrated circuit 300 in accordance with the teachings of the present invention.

In the example depicted in FIG. 3, controller 330 is an LLC resonant controller with programmable burst start and stop frequencies that includes a feedback sense FBllc pin 339, which is coupled to receive a feedback signal. Controller 330 also includes a maximum frequency limit FMAX pin 338, which is coupled to receive a signal to adjust the maximum frequency. Controller 330 also includes an internal reference voltage VDDREF pin 340, which is coupled to provide a reference voltage. Controller 330 also includes the resonant current sense ISNS pin 334, which is coupled to sense a current through a LLC resonant circuit. Controller 330 also includes a VDD/L pin 335, which is to be coupled to an internal supply point referred to as low side ground. Driver B includes a VDD/H pin 325, which is to be coupled to an internal supply point referred to as a high side common. In the illustrated example, an upper drain connection D 305 is coupled to the drain of switch 320 and a lower source connection S 306 is coupled to the source of switch 310. A mid point of half bridge switcher HB 350 is coupled to the node between switches 310 and 320 and a ground connection GND 360 is coupled to provide ground for the controller 330, driver A and switch 310. It is appreciated that the common names of pins in FIG. 3 and in FIG. 2 are compatible in accordance with the teachings of the present invention.

In the example depicted in FIG. 3, driver A 311 is a low side driver while driver B 321 is a high side driver. In one example, driver A 311 and driver B 321 are implemented as separate blocks from controller 330. In another example, driver A 311 is merged into controller 330 while driver B 321 is still a separate block from controller 330 because of a shifted reference to the half bridge mid point 350 (COM/H 315) that forms a separate block as shown in FIG. 3. It is appreciated that the internal coupling between the blocks and pin outs as shown in the example depicted in FIG. 3 represent only one example implementation and that other arrangements or extra features and pin outs may be included based on the application.

Figure 4:
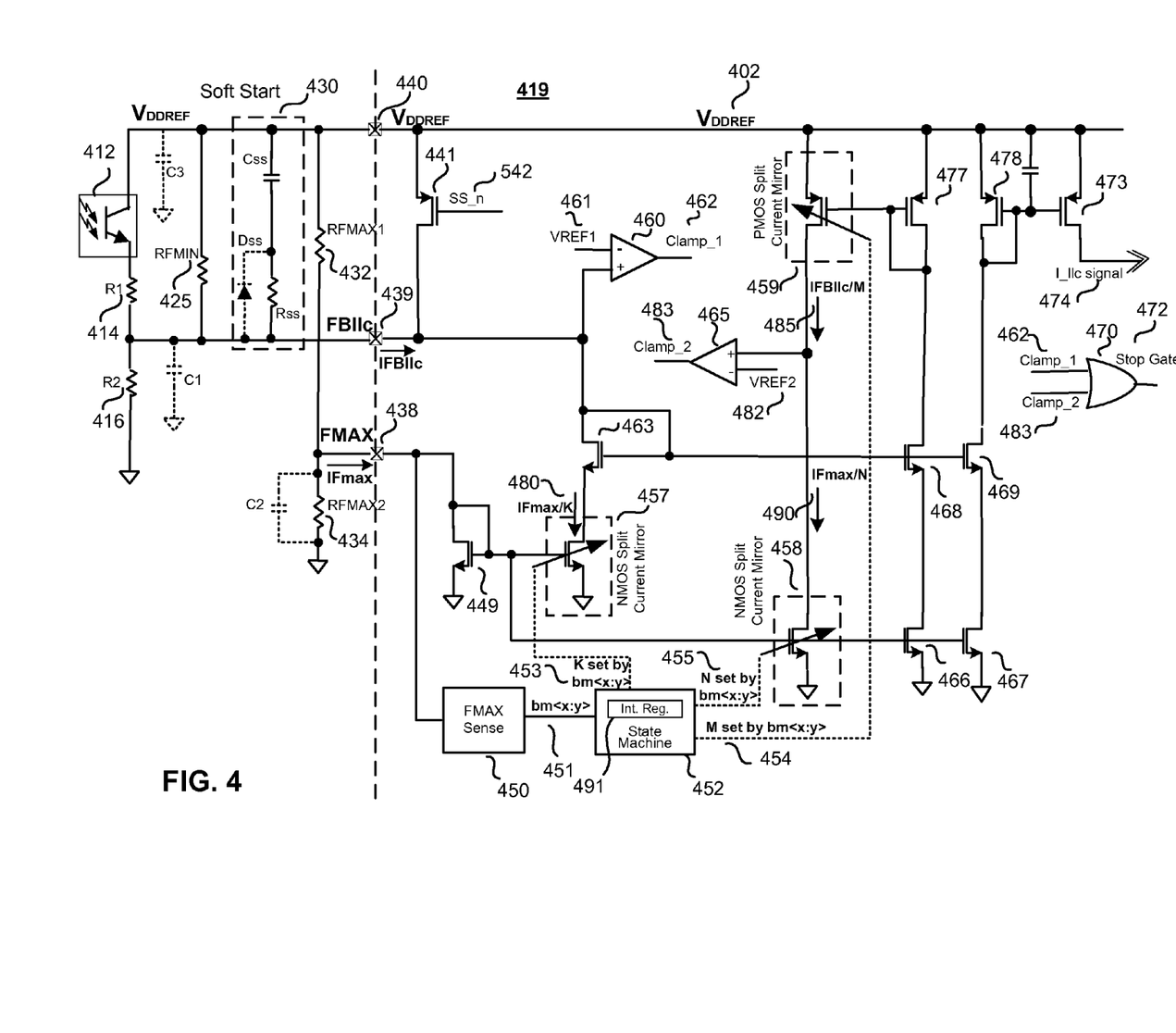
FIG. 4 is a schematic illustrating one example of external and internal circuitry of a feedback control for the programmable fractional burst frequency in accordance with the teachings of the present invention.

FIG. 4 is a schematic illustrating one example of external and internal circuitry of a feedback control circuit 419 included in an example controller with programmable burst start and stop frequencies in accordance with the teachings of the present invention. As shown in the depicted example, a phototransistor of an optocoupler 412 is coupled to receive an optical signal from an LED (not shown) of the optocoupler that is representative of an output of an LLC resonant converter. In the illustrated example, the phototransistor of optocoupler 412 is coupled to VDDREF pin 440 to adjust a current from VDDREF bus 402 to resistors R1 414, resistor R2 416 and to feedback pin FBllc 439, which provides feedback that is used for frequency control and output regulation. A pull up resistor RFMIN 425 coupled between VDDREF pin 440 and FBllc pin 439 sources a minimum current to FBllc pin 439 to adjust a minimum switching frequency of the LLC resonant converter. In one example, resistor RFMIN 425 is an external resistor that can be selected to program a minimum frequency of the LLC resonant converter in accordance with the teachings of the present invention.

In the depicted example, when the power converter is initially started or restarted after a fault condition, it is desired to start switching the LLC resonant converter in a soft start mode at maximum frequency FMAX with minimum power transfer to the output of the power converter. During the soft start mode, the switching frequency of the LLC resonant converter gradually decreases at a rate determined by a soft start circuit 430, by sourcing a current from VDDREF bus 402 to FBllc pin 439, which gradually decays as capacitor Css is charged. In the illustrated example, the diode Dss coupled across resistor Rss is optional. As capacitor Css is charged, the frequency gradually decays from FMAX until the feedback signal received through optocoupler 412 begins to control the frequency. In one example, a MOSFET 441 is coupled between VDDREF pin 440 and FBllc pin 439 as shown. In operation, MOSFET 441 pulls the FBllc pin 439 to VDDREF pin 440 in response to a soft start negate signal ss_n 442, which is enabled through a soft start reset. As will be described in more detail below, this activates a clamping signal and stops the gating signals generated for example by driver circuits driver A 211 and driver B 221 of FIG. 2, or driver A 311 and driver B 321 of FIG. 3. In the example, the external soft-start capacitance Css discharges so that the controller frequency slowly drops into its operating range as switching resumes.

As shown in the illustrated example, resistors RFMAX1 432 and RFMAX2 434 are coupled to FMAX pin 438, with an optional capacitor C2 coupled across resistor RFMAX2 434. In the example, resistors RFMAX1 432 and RFMAX2 434 are external resistors that can be selected to program a maximum switching frequency FMAX of the LLC resonant converter in accordance with the teachings of the present invention. In the example, resistor RFMAX1 432 is also coupled to VDDREF bus 402, which in one example provides a voltage of 3.3 V that is generated by the internal series regulator, not shown, and the lower resistor RFMAX2 434 coupled between FMAX pin 438 and ground In one example, resistors RFMAX1 432 and RFMAX2 434 are also used to program a fractional burst frequency in accordance with the teachings of the present invention. For instance, in one example, the voltage of the FMAX pin 438 is sensed to set a fractional burst frequency during a power up state after exiting an undervoltage lockout UVLO and after the voltage on FMAX pin 438 has settled. In one example, when switching in the LLC resonant controller is disabled or when the LLC resonant controller is powered down, voltage sensing of the external resistor divider formed with resistor RFMAX1 432 and RFMAX2 434 at FMAX pin 438 is performed.

In one example, the sensing of the voltage at FMAX pin 438 occurs when substantially no current is drawn from FBllc pin 439 and FMAX pin 438 before switching resumes and current begins to flow. As shown in the illustrated example, an FMAX sense block 450 is coupled to FMAX pin 438 to sense the open circuit voltage at FMAX pin 438 received through the resistive divider formed with resistor RFMAX1 432 and resistor RFMAX2 434. In one example, the voltage sensed at the FMAX pin 438 by FMAX sense block 450 is compared to multiple thresholds to select a corresponding burst mode of operation, such as for example burst mode 1, burst mode 2 or burst mode 3 in accordance with the teachings of the present invention. As shown, FMAX sense block 450 generates a corresponding burst mode bm<x:y> signal 451 in response to the comparison, which is coupled to be received by a state machine block 452. In one example, burst mode bm<x:y> signal 451 includes a plurality of digital bits that correspond to the selected burst mode of operation.

In one example, state machine block 452 generates fraction coefficient signals K 453, M 454 and N 455 in response to the selected burst mode of operation, as indicated by the burst mode bm<x:y> signal 451 in accordance with the teachings of the present invention. Accordingly, in one example, a designer can select different approaches to program fraction coefficient signals K 453, M 454 and N 455, and therefore program the burst stop and start frequencies Fstop and Fstart, by making appropriate selections for the external resistors RFMAX1 432 and resistor RFMAX2 434 that form the resistive divider coupled to the FMAX pin 438 and by programming internal registers 491 of the state machine 452 in accordance with the teachings of the present invention.

As shown in the depicted example, K 453 is coupled to program an NMOS fractional current mirror 457, N 455 is coupled to program an NMOS fractional current mirror 458, and M 454 is coupled to program a PMOS fractional current mirror 459 in accordance with the teachings of the present invention. In the illustrated example, the corresponding currents generated by NMOS fractional current mirror 457, NMOS fractional current mirror 455 and PMOS fractional current mirror 459 are fractional currents IFmax/K 480, IFmax/N 490 and IFBllc/M 485, respectively. As mentioned, state machine block 452 may also include internal registers 491 which can be pre-programmed to further adjust the fraction coefficient signals K 453, M 454 and N 455 to program the burst stop and start frequencies, Fstop and Fstart, in accordance with the teachings of the present invention.

As shown in the example depicted in FIG. 4, the current IFmax that flows through the FMAX pin 438 is conducted through a diode connected transistor 449 and is mirrored to the programmable NMOS fractional current mirror 457 as well as to the programmable NMOS fractional mirror 458. In the example, a split structure of NMOS fractional current mirror 457 is programmed in response to K 453 generated by state machine 452 to provide fractional current IFmax/K 480. Similarly, a split structure of NMOS fractional current 458 is programmed in response to N 455 generated by state machine 452 to provide fractional current IFmax/N 490.

As shown in FIG. 4, the current IFBllc that flows through the diode connected transistor 463 is also mirrored to NMOS transistors 468 and 469. The current IFBllc that is mirrored to NMOS transistor 468 is conducted through NMOS transistor 466 as well as the diode connected PMOS transistor 477, which is coupled to VDDREF bus 402 and is mirrored to the programmable PMOS fractional current mirror 459, which is also coupled to VDDREF bus 402. In the example, a split structure of PMOS fractional current mirror 459 is programmed in response to M 454 generated by state machine 452 to provide fractional IFBllc/M 485.

As shown in the illustrated example, a comparator 460 has an inverting input coupled to a reference voltage VREF1 461. The non-inverting input of comparator 460 is coupled to the diode connected transistor 463, through which current IFBllc is mirrored, and also through which IFmax/K 480 flows through split structure of NMOS fractional current mirror 457. In the example, comparator 460 outputs a clamp_1 signal 462 in response to a comparison of the currents IFBllc and IFmax/K 480. In addition, a comparator 465 has an inverting input coupled to a reference voltage VREF2 482. The non-inverting input of comparator 465 is coupled to the split structure of PMOS fractional current mirror 459, through which IFBllc/M 485 flows. The non-inverting input of comparator 465 is also coupled to the split structure of NMOS fractional current mirror 458, through which IFmax/N 490 flows. In the example, comparator 465 outputs a clamp_2 signal 483 in response to a comparison of the currents IFBllc/M 485 and IFmax/N 490.

In the example, an OR gate 470 is coupled to receive the clamp_1 signal 462 from comparator 460 and the clamp_2 signal 483 from comparator 465. As shown, OR gate 470 is coupled to generate a stop gate signal 472 in response to clamp_1 signal 462 or clamp_2 signal 483 being activated. In one example, when the stop gate signal 472 is activated, switching of the LLC resonant converter is stopped, which may correspond to the programmable fractional burst stop frequency being reached in accordance with the teachings of the present invention. In one example, when the stop gate signal 472 is deactivated, switching of the LLC resonant converter is started or restarted, which may correspond to the programmable fractional burst start frequency being reached in accordance with the teachings of the present invention.

In the depicted example, comparator 465 and NMOS transistor 466 are also used to limit the feedback current IFBllc that is mirrored to NMOS transistor 468 by diode connected NMOS transistor 463 to a value below IFmax. In particular, as the current through NMOS transistor 468 approaches IFmax, as mirrored to NMOS transistor 466 by diode connected NMOS transistor 449, NMOS transistor 466 becomes open, which results in pulling up the voltage at the non-inverting input of comparator 465 towards a higher voltage than the VREF2 482 reference voltage at the inverting input of comparator 464, which activates the clamp_2 signal 483. In addition, the feedback current IFBllc is also mirrored to NMOS transistor 469 by diode connected NMOS transistor 463. As shown, NMOS transistor 469 is stacked with NMOS transistor 467, through which the IFmax is mirrored by the diode connected NMOS transistor 449, which therefore also limits the feedback current IFBllc to below IFmax. As shown, diode connected PMOS transistor 478 coupled to VDDREF bus 402 is also stacked with NMOS transistor 469 and NMOS transistor 467. In the example, since diode connected PMOS transistor 478 is stacked with NMOS transistor 469, the feedback current IFBllc is also mirrored to PMOS transistor 478 by diode connected NMOS transistor 463. As a result, the feedback current received at a feedback pin IFBllc 439 is mirrored to the output PMOS transistor 473 to transfer an I_llc signal 474 to a current controlled oscillator. Therefore, as will be discussed, the current controlled oscillator coupled to receive the I_llc signal 474 is responsive to the feedback current received at a feedback pin IFBllc 439 to regulate an output of the power converter in accordance with the teachings of the present invention.

Figure 5:
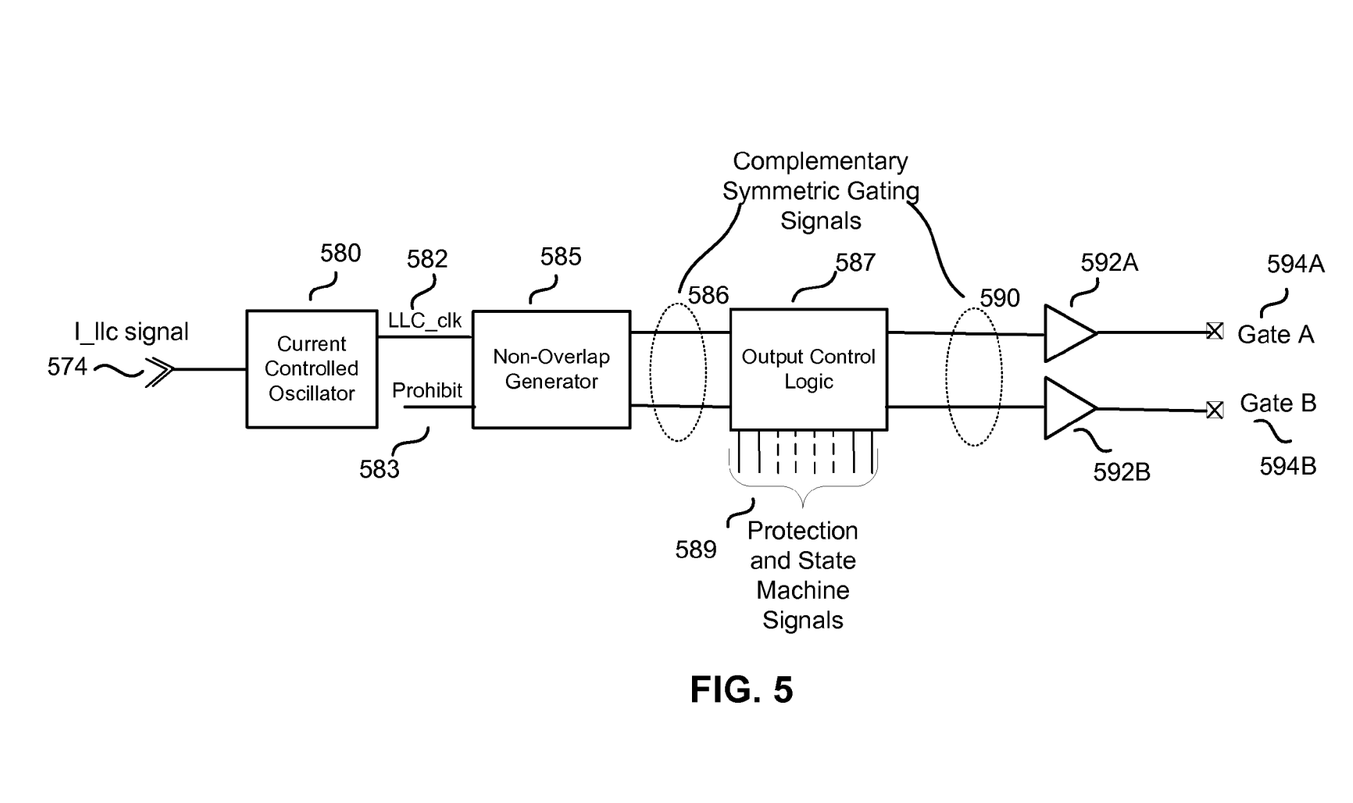
FIG. 5 is a schematic illustrating an example of additional internal circuitry of a feedback control for the programmable fractional burst frequency in accordance with the teachings of the present invention.

To illustrate, FIG. 5 shows an I_llc signal 574, which may correspond to I_llc 474 of FIG. 4, is coupled to be received by a current controlled oscillator 580 in FIG. 5. In the example, current controlled oscillator 580 generates an oscillating LLC clock signal 582 with a frequency that is responsive to the I_llc signal 574, which is responsive to the feedback current received at a feedback pin IFBllc 439 of FIG. 4. In one example, a non-overlap generator block 585 in FIG. 5 is coupled to receive the LLC clock signal 582 and a prohibit signal 583. In one example, prohibit signal 583 is used to indicate a prohibiting condition such as for example the clamp_1 signal 462, the clamp_2 signal 483 and/or any other prohibiting conditions. In one example, non-overlap generator block 585 generates two symmetric complementary gating signals 586 in each clock cycle in response to LLC clock signal 582 and the prohibit signal 583. As shown, an output control logic block 587 is coupled to receive the two symmetric complementary gating signals 586 from non-overlap generator 585 and protection and state machine signals 589. In the example, output control logic 587 generates complementary symmetric gating signals 590 in response to complementary gating signals 586 and the received protection and state machine signals 589. As shown, the complementary symmetric gating signals 590 are applied to upper side and lower side drivers 592A and 592B with appropriate isolation. In the illustrated example, the gating signals from output of the drivers 592A and 592B are applied to gate A 594A and gate B 594B, which in one example may correspond to the gates of upper and lower switches of the half bridge, shown for example as switches 168 and 169 in FIG. 1, or switches 210 and 220 in FIG. 2, or switches 310 and 320 in FIG. 3, respectively.

Continuing now back with the example illustrated in FIG. 4, it is appreciated that the burst start frequency, Fstart, and burst stop frequency, Fstop, may be programmed as fractions of the maximum frequency FMAX in accordance with the teachings of the present invention. In one example, programming of the burst stop frequency, Fstop, and burst start frequency, Fstart, is achieved through activation and deactivation of the stop gate signal 472 in response to the adjustable split structures of the NMOS fractional current mirror 457, NMOS fractional current mirror 458 and PMOS fractional current mirror 459 in response to the fraction coefficient signals K 453, M 454 and N 455, respectively, in accordance with the teachings of the present invention. As mentioned above, state machine block 452 includes internal registers 491, which can be programmed to adjust the fraction coefficient signals K 453, M 454 and N 455 to program the burst stop and start frequencies, Fstop and Fstart, in accordance with the teachings of the present invention.

As mentioned previously, the current IFmax through FMAX pin 438 and through the diode connected transistor 449 is mirrored to the NMOS fractional current mirror 458 as shown. In the example, the NMOS fractional current mirror 458 is programmed in response to the coefficient signal N 455 created by the state machine 452, which controls current through NMOS fractional current mirror 458. In the example, the clamp_2 signal 483 is activated by comparator 465 when IFBllc/M 485 through PMOS fractional current mirror 462 is greater than IFmax/N 490 through NMOS fractional current mirror 458. By decreasing M 454, or increasing N 455, the activation of the clamp_2 signal 483 from comparator 465 can be adjusted. Thus, a lower burst start frequency Fstart that is less that the burst stop frequency Fstop, such that Fstart<Fstop, can be programmed in accordance with the teachings of the present invention. The switching of the power switches, such as switches 168 and 169 in FIG. 1, or switches 210 and 220 in FIG. 2, or switches 310 and 320 in FIG. 3 can be stopped with the stop gate signal 472 at the output of OR gate 470 through the activation of either clamp_1 signal 462 or clamp_2 signal 483 in accordance with the teachings of the present invention.

A first example of programming the burst start frequency, Fstart, and burst stop frequency, Fstop, may be achieved by adjusting the coefficient signal K 453 through a state machine as follows. In particular, the current into the FBllc pin 439 is limited by NMOS fractional current mirror 457 and cannot exceed IFmax/K 480, which is the mirrored current through the FMAX pin 438 through diode connected transistor 449, and is controlled by the coefficient signal K 453 as set by the state machine 452. If the current IFBllc tries to exceed IFmax/K 480, then the voltage at FBllc pin 439, which is coupled to the non-inverting input of comparator 460, is pulled towards a higher voltage greater than the VREF1 461 reference voltage at the inverting input of comparator 460, which causes the clamp_1 signal 462 to be activated, which turns off the stop gate signal 472 through OR gate 476.

During soft-start, state machine 452 sets K=1. Thus, IFmax/K 480=IFmax/1=IFmax. Therefore, the current IFBllc through FBllc pin 439 would be limited or clamped to IFmax during soft start. In one example, state machine 452 could modify and increase K>1 after soft start, to program a burst stop frequency, Fstop, that is a fraction of maximum frequency FMAX in accordance with the teachings of the present invention. For example, to adjust Fstop to be 50% FMAX, K is set to equal 2 by the state machine 452 after the soft start is completed. Now, whenever IFBllc>IFmax/2, the voltage on FBllc pin 439 reaches the VREF1 461 threshold and the clamp_1 signal 462 is activated, which activates the stop gate signal 472 through OR gate 476, which stops the switching. This corresponds to one example of the programmable fractional burst stop frequency, Fstop, being reached in accordance with the teachings of the present invention.

In this example of programming the burst stop frequency, Fstop, with a voltage rise on FBllc pin 439 as the IFBllc current reaches IFmax/K, there is a significant effect of the external resistor Rss and capacitor Css of soft start circuit 430 on the FBllc pin 439 voltage rise, which may affect the burst behavior and slow down the burst timing. An advantage with this approach is that flexibility is provided so that a user could have some external control of the burst timing by making corresponding design decisions when selecting the external resistor Rss and capacitor Css of soft start circuit 430 in accordance with the teachings of the present invention.

Continuing with the example, the state machine 452 modifies K 453 after the active clamp_1 signal 462 has been detected as described above to program a burst start frequency, Fstart. In one example, the burst start frequency, Fstart is less than the burst stop frequency, Fstop, such that Fstart<Fstop. For instance, in the above example where K=2 and Fstop=½*FMAX (i.e., 50% of maximum frequency), state machine 452 then modifies K 453 from 2 to 3 after the clamp_1 signal 463 has been activated and switching has stopped as described above to now program Fstart=33% of the maximum frequency FMAX in accordance with the teachings of the present invention. Now when the feedback current IFBllc falls to IFmax/3, the clamp_1 signal 462 is deactivated and the stop signal 472 signal is deactivated, which restarts the switching. This corresponds to one example of the programmable fractional burst start frequency, Fstart, being reached in accordance with the teachings of the present invention.

In a second example, the programming of the burst start frequency Fstart and burst stop frequency Fstop may be achieved by adjusting coefficient signals M and N through a state machine as follows. In this example, state machine 452 is set to fix K=1, such that the feedback current IFBllc is limited to IFmax. Accordingly, when IFBllc reaches IFmax, the clamp_1 signal 462 is activated and switching will stop via stop gate signal 472 being activated as discussed above. To get Fstop=½ FMAX (i.e., 50% of maximum frequency), the state machine 452 instead initially sets N=2*M. Thus, when IFBllc/M>IFmax/N, the clamp_2 signal 483 is activated by comparator 465, which activates stop gate signal 472 at OR gate 470, and stops switching in the LLC resonant converter in accordance with the teachings of the present invention. This corresponds to another example of the programmable fractional burst stop frequency, Fstop, being reached in accordance with the teachings of the present invention.

Continuing with the example, to get Fstart=33% of maximum frequency, after detecting the active clamp_2 signal 483 and switching has stopped, state machine 452 changes N=3*M. It is appreciated that changing N=3*M could be realized by either modifying N 455 or M 454, either increasing N or reducing M, which results in making Fstart<Fstop. Thus, when IFBllc/M<IFmax/N, the clamp_2 signal 483 will be deactivated, which will deactivate the stop gate signal 472 at OR gate 470, and switching then restarts or resumes. This corresponds to another example of the programmable fractional burst start frequency, Fstart, being reached in accordance with the teachings of the present invention.

In this approach, the external soft-start circuit 430 components Rss and Css do not impact the burst behavior as in the previous example and can provide faster burst timing with less hysteresis. This allows Fstop and Fstart to be adjusted close together and could reduce output ripple due to the stopping of switching in burst mode.

In a third example, the programming of the burst start frequency Fstart and burst stop frequency Fstop may be achieved using a hybrid approach that combines the two previously discussed approaches by adjusting coefficient signal K as well as the coefficient signals M and N through a state machine as follows. In particular, at soft start K=1 and M=N, such that IFBllc is limited to IFmax. At soft start, when IFBllc reaches IFmax, the clamp_1 signal 462 and clamp_2 signal 483 are both activated and switching has not yet started. As IFBllc drops below IFmax, the clamp_1 signal 462 and the clamp_2 signal 483 are deactivated and switching then starts at a substantially maximum frequency, which results in a substantially minimum energy transfer. The switching frequency then gradually decreases towards the normal regulation.

After completion of the soft-start, K is modified and increased by the state machine to a value of K>1 such that a current IFstop=IFmax/K, which corresponds to Fstop=FMAX/K. When the load coupled to the output of the LLC resonant converter causes the control frequency to increase to a value above the burst stop frequency, Fstop, which indicates that IFBllc>IFmax/K, the NMOS fractional current mirror 457 appears as high impedance causing the voltage on FBllc pin 439 to rises to the reference voltage VREF1 resulting in the clamp_1 signal 462 to be activated by comparator 460. As a result of clamp_1 signal 462 being activated, the stop gate signal 472 signal is activated by OR gate 470, which causes the switching of the LLC resonant converter to stop. This corresponds to one example of the programmable fractional burst stop frequency, Fstop, being reached in accordance with the teachings of the present invention.

In the example, after the state machine 452 has sensed that the clamp_1 signal 462 has been activated and switching has therefore been stopped, the state machine 452 then modifies N to be a fraction of M, which is the same as modifying M to be a multiple of N. In other words, M/N is set to be greater than one. For example, to adjust Fstart to be ¹⁄₁₆th less than Fstop, the coefficient signal M 454 is decreased to M' such that M'/M is equal to ¹⁵⁄₁₆ths. At this point, the clamp_1 signal 462 remains active and the clamp_2 signal 483 is activated as well. When IFBllc<IFmax/K, the clamp_1 signal 462 is deactivated, but the clamped_2 signal 483 remains activated. From this point, the relation between IFBllc/M and IFmax/N defines the burst start frequency, Fstart. For instance, when IFBllc/M<IFmax/N, then both the clamp_1 signal 462 and the clamp_2 signal 483 are deactivated, which causes the stop gate 472 signal to be deactivated, which causes switching to resume. This corresponds to one example of the programmable fractional burst start frequency, Fstart, being reached in accordance with the teachings of the present invention. It is noted that when Fstart is adjusted by state machine 452 to be less than Fstop by modifying M and N as discussed above, it should be ensured that every time at Fstart when switching is resumed, M is increased back to equal N. In a case where N has been increased, N should be decreased back to equal N.

With this approach of independently adjusting and programming Fstop and Fstart as discussed above, the burst stop frequency, Fstop, is programmed by the activation of the clamp_1 signal 462 followed by the activation of the stop gate signal 472. In the example, the state machine 452 sets M/N>1 and then waits for the feedback threshold of IFBllc<IFmax (M/N), which deactivates the clamp_2 signal 483, which causes switching to resume as discussed above.

In other words, a hysteresis between Fstop and Fstart is defined by a difference between IFmax/K and IFmax(M/N) in accordance with the teachings of the present invention. The state machine 452 then waits until the clamp_2 signal 483 is deactivated to resume switching again. In the example, the clamp_2 signal 483 is not deactivated again until IFBllc/M<IFmax/N. It is noted that an advantage with this approach, compared to the approach of just adjusting K as discussed previously is that even though the soft start circuit 430 components of Css and Rss may impact the Fstop switching, the components have less influence on the timing of the burst stop and start in accordance with the teachings of the present invention.

Figure 6:
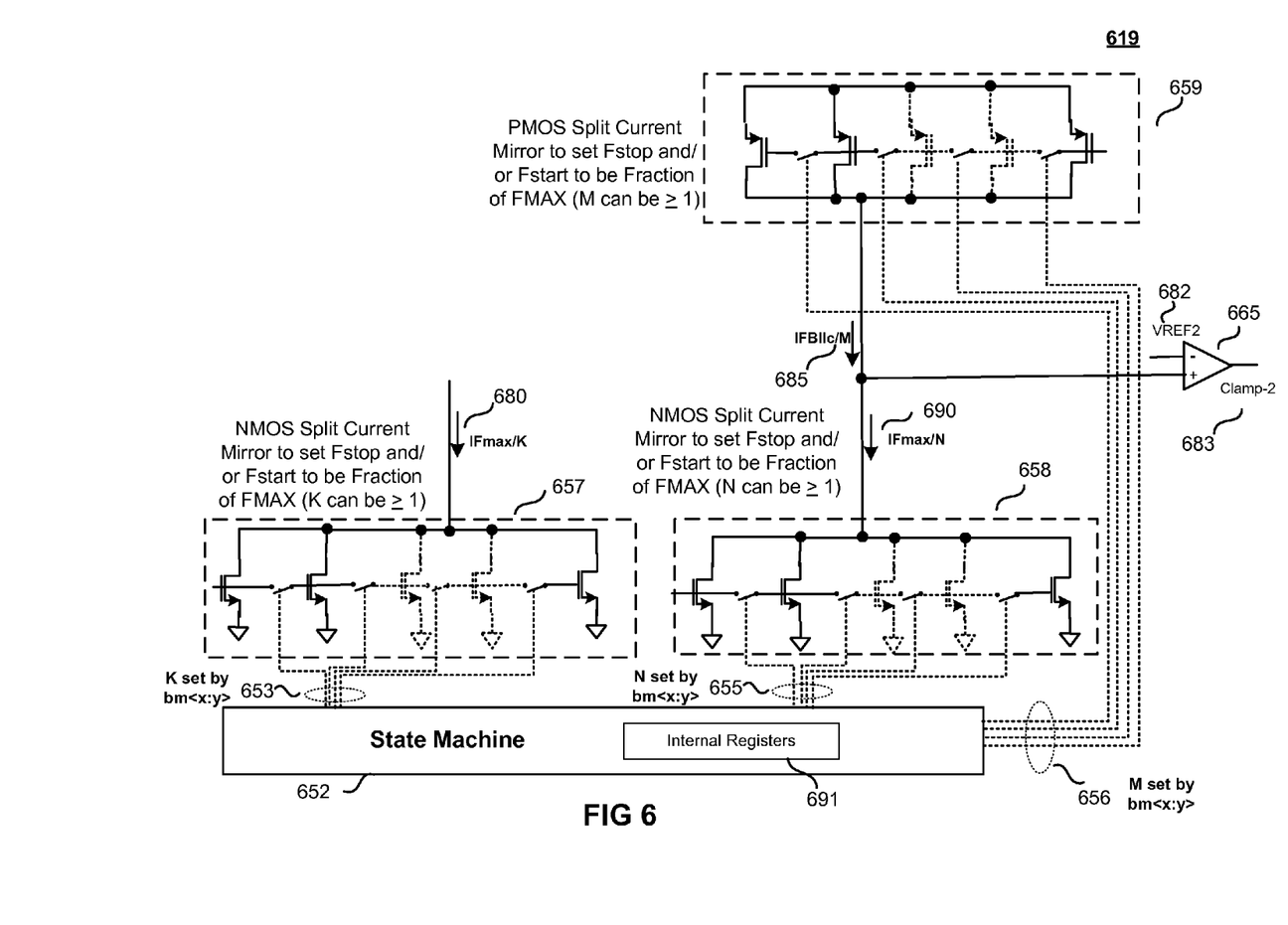
FIG. 6 is a schematic showing a more detailed circuit diagram of an example internal structure of NMOS and PMOS blocks of fractional current mirror stacked FETs with the interconnect controlled switches in accordance with the teachings of the present invention.

FIG. 6 is a schematic showing a more detailed circuit diagram of an example internal structure of a feedback control circuit 619 including NMOS fractional current mirrors 657 and 658 and PMOS fractional current mirror 659 in accordance with the teachings of the present invention. In one example, NMOS fractional current mirrors 657 and 658 and PMOS fractional current mirror 659 of FIG. 6 correspond to NMOS fractional current mirrors 457 and 458 and PMOS fractional current mirror 459, respectively, of FIG. 4 in accordance with the teachings of the present invention. As shown in the illustrated example, a state machine 652 is coupled to generate fraction coefficient signals K 653, M 654 and N 655. In one example, state machine 652 and fraction coefficient signals K 653, M 654 and N 655 of FIG. 6 correspond to state machine 452 and fraction coefficient signals K 453, M 454 and N 455, respectively, of FIG. 4. In one example, state machine block 652 includes internal registers 691 which can be programmed to adjust the fraction coefficient signals K 653, M 654 and N 655 to program the fractional burst stop and start frequencies, Fstop and Fstart, in accordance with the teachings of the present invention.

As shown in the illustrated example, a current IFmax/K 680 is coupled to flow through NMOS fractional current mirror 657, which includes a plurality of NMOS transistors coupled in parallel to ground. In the example, each respective gate of the plurality of NMOS transistors is coupled to be selectively activated or deactivated in response to a respective bit bm<x:y> of K 653 received from state machine 652. As a result, each one of the plurality of NMOS transistors can be individually turned on or off in response to a respective bit bm<x:y> of K 653. In the illustrated example, NMOS fractional current mirror 657 is coupled to provide IFmax/K 680 to set the Fstop and/or Fstart burst start and stop frequencies to be a fraction of FMAX with K being set to a value greater than or equal to one in accordance with the teachings of the present invention.

In the illustrated example, PMOS fractional current mirror 659 includes a plurality of PMOS transistors coupled in parallel to provide a current IFBllc/M 685. In the example, each respective gate of the plurality of PMOS transistors is coupled to be selectively activated or deactivated in response to a respective bit bm<x:y> of M 656 received from state machine 652. As a result, each one of the plurality of PMOS transistors of PMOS fractional current mirror 659 can be individually turned on or off in response to a respective bit bm<x:y> of M 656. In the illustrated example, PMOS fractional current mirror 659 is coupled to provide IFBllc/M 685 to set the Fstop and/or Fstart burst start and stop frequencies to be a fraction of FMAX with M being set to a value greater than or equal to one in accordance with the teachings of the present invention.

As shown in the depicted example, a current IFmax/N 690 is coupled to flow through NMOS fractional current mirror 658, which includes a plurality of NMOS transistors coupled in parallel to ground. In the example, each respective gate of the plurality of NMOS transistors is coupled to be selectively activated or deactivated in response to a respective bit bm<x:y> of N 655 received from state machine 652. As a result, each one of the plurality of NMOS transistors can be individually turned on or off in response to a respective bit bm<x:y> of N 655. In the illustrated example, NMOS fractional current mirror 658 is coupled to conduct the current IFmax/N 690 to set the Fstop and/or Fstart burst start and stop frequencies to be a fraction N of FMAX, with N being set to a value greater than or equal to one in accordance with the teachings of the present invention.

As shown in the illustrated example, a comparator 665 has an inverting input coupled to reference voltage VREF2 682. The non-inverting input of comparator 665 is coupled to the PMOS fractional current mirror 659, through which the current IFBllc/M 685 flows. The non-inverting input of comparator 665 is also coupled to the NMOS fractional current mirror 658, through which the current IFmax/N 690 flows. As shown, comparator 665 is coupled to activate the clamp_2 signal 683, which stops the switching of the power converter if IFBllc/M>IFmax/N. As discussed above in one example, after switching has been stopped, the state machine 652 may increase M to M' such that switching is restarted when IFBllc/M'<IFBllc/N. In the example, the ratio between M and M' defines the hysteresis between current corresponding to Fstop and the current corresponding to Fstart. In other words, the ratio between M and M' defines a hysteresis between Fstop and Fstart of the stopping and restarting the switching of the LLC resonant converter in accordance with the teachings of the present invention.

For instance, in one example, if it is desired that Fstart is 1/16th less than Fstop, then M/M' is set by state machine 652 to equal 15/16ths. In the example, the clamp_2 signal 683 will be deactivated when IFmax/M'<IFmax/N indicating that Fstart has been reached to restart switching. In another example, N can be reduced such that the clamp_2 signal 683 will be deactivated when IFmax/M'<IFmax/N. In still another example, the hysteresis can be set to a fixed value, such as for example a value of IFmax/8, which could be applied between the activation and deactivation of the clamp_2 683 signal in accordance with the teachings of the present invention. It is appreciated of course that these examples are all provided for explanation purposes and that other adjustments to the fraction coefficient signals K 653, M 654 and N 655 can be made to program fractional burst stop and start frequencies, Fstop and Fstart, in accordance with the teachings of the present invention.

Figure 7:
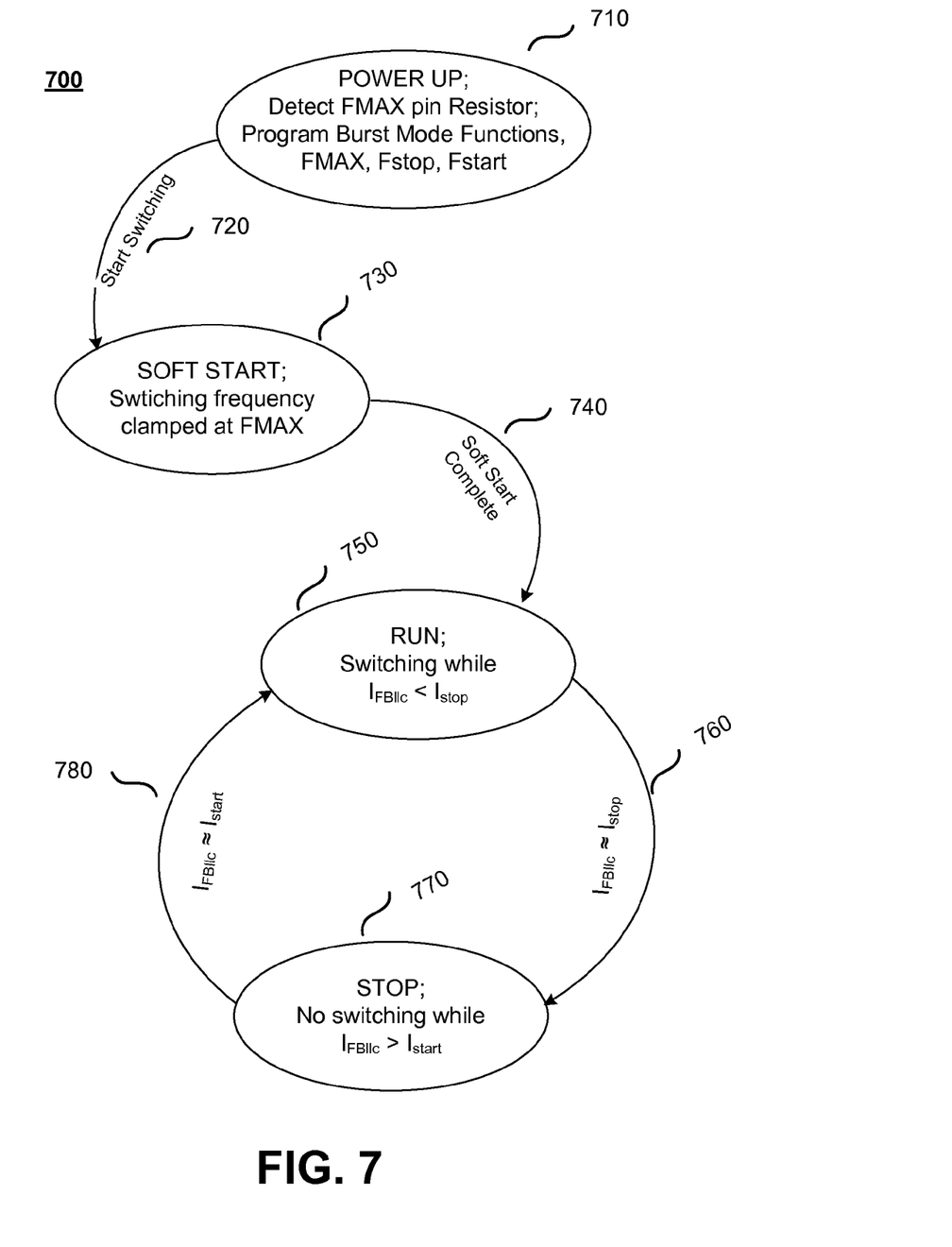
FIG. 7 shows an example of a state flow diagram that illustrates state transitions in accordance with the teachings of the present invention.

FIG. 7 shows one example of the state flow diagrams 700 that illustrate state transitions to program fractional burst stop and start frequencies in an LLC resonant converter in accordance with the teachings of the present invention. As shown in state flow diagram 700 in FIG. 7, in the POWER UP state 710 before switching starts, an FMAX pin resistance is detected by sensing the open circuit voltage, such as for example the Thevenin voltage, at the FMAX pin (e.g., FMAX pin 438 in FIG. 4) to program burst mode functions and the burst stop and start frequencies, Fstop and Fstart. As described for example with respect to FIG. 6 above, the coefficient signals K, M and N in one example can be determined in response to the FMAX pin resistance to define interconnections and switch couplings in NMOS fractional current mirrors 657 and 658 and PMOS fractional current mirror 659 of FIG. 6.

Then, switching is started in the LLC resonant converter to regulate an output of the LLC resonant converter as represented with transition 720 to the SOFT START state 730, at which time soft start occurs. During SOFT START state 730, the switching frequency is limited to less than a maximum frequency FMAX, which is the frequency that results in minimal power transfer. As the SOFT START state 730 is completed, which may be determined for example by sensing a decayed current to the FBllc pin falling below a threshold, or by a soft start timer, or by another suitable method, a transition occurs from the SOFT START state 730 to a RUN state 750 as shown.

After the SOFT START state 730 has been completed, the RUN state 750 occurs at which time switching occurs in the LLC resonant converter in response to a feedback signal to regulate the output of the LLC resonant converter. During the RUN state 750, the feedback current IFBllc to the FBllc pin is compared to a current Istop, which corresponds to the Fstop frequency. In one example, as shown with transition 760, operation transitions to a STOP state 770 when the feedback current IFBllc rises to be approximately equal to the current Istop, which corresponds to the programmed fractional burst stop frequency, Fstop, in accordance with the teachings of the present invention.

While in the STOP state 770, switching in the LLC resonant converter has been stopped, which results in the feedback current decreasing. As shown, transition 780 occurs from STOP state 770 back to RUN state 780 when the feedback current IFBllc falls to a value approximately equal to the current Istart, which corresponds to the programmed fractional burst start frequency, Fstart, in accordance with the teachings of the present invention.

In one example, the hysteresis for the burst mode associated with FBllc pin, which is implicit in clamping signal generation, is equal to Istop−Istart. In one example, the hysteresis may have a typical value of IFmax/8 for all the possible burst modes from soft start to normal operation and to the burst mode. In one example, every time the LLC resonant converter is restarted after a power down condition, the state machine sets K=1, the feedback current IFBllc is limited to IFmax, and as long as the feedback current IFBllc is approximately equal to IFmax, the clamp_1 signal is activated until the feedback current IFBllc falls to Istart.

It is appreciated that a power converter with a programmable burst start and stop frequencies in accordance with the teachings of the present invention improves efficiency at light load and no load. As described above, burst start and stop frequencies Fstart and Fstop are programmed for example to be fractions of the maximum frequency FMAX in accordance with the teachings of the present invention. As the operating and maximum frequency vary, the burst stop and start frequencies vary accordingly.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of controlling an LLC resonant converter, comprising:
    detecting a maximum frequency signal to set a maximum switching frequency of the LLC resonant converter;
    programming a burst stop frequency and a burst start frequency in response to the maximum switching frequency, wherein the burst stop frequency and the burst start frequency are fractions of the maximum switching frequency;
    switching the LLC resonant converter in response to a feedback signal to regulate an output of the LLC resonant converter;
    repeating the steps of:
        switching the LLC resonant converter in a run state in response to the feedback signal reaching a value corresponding to the programmed burst start frequency; and
        stopping the switching of the LLC resonant converter in a stop state in response to the feedback signal reaching a value corresponding to the programmed burst stop frequency.

2. The method of claim 1 wherein the programmed burst start frequency is less than the programmed burst stop frequency.

3. The method of claim 1 further comprising clamping a switching frequency of the LLC resonant converter at the maximum switching frequency of the LLC resonant converter during a soft start of the LLC resonant converter.

4. The method of claim 1 further comprising programming the maximum frequency signal by selecting an external resistance coupled between a maximum frequency pin of an LLC resonant controller and ground.

5. The method of claim 1 further comprising further programming the burst stop frequency and the burst start frequency in response to programming internal registers of a state machine of an LLC resonant controller.

6. The method of claim 1 wherein stopping the switching of the LLC resonant converter in response to the feedback signal reaching a value corresponding to the programmed burst stop frequency comprises comparing a feedback current with a current through a fractional current mirror.

7. The method of claim 6 wherein programming the burst stop frequency and the burst start frequency in response to the maximum switching frequency comprises programming the current through the fractional current mirror.

8. The method of claim 7 wherein programming the current through the fractional current mirror comprises selectively activating or deactivating each of a plurality of transistors included in the fractional current mirror.

9. A controller for use in an LLC resonant converter, comprising:
    first and second fractional current mirrors coupled to be driven in response to a maximum frequency signal;
    a third fractional current mirror coupled to be driven in response to a feedback signal representative of an output of the LLC resonant converter;
    a state machine coupled to the first, second and third fractional current mirrors to control a first, second and third current through the first, second and third fractional current mirrors, respectively;
    a first comparator coupled to generate a first clamp signal in response to a comparison of a feedback current and the first current;
    a second comparator coupled to generate a second clamp signal in response to a comparison of a third current and the second current; and
    an oscillator coupled to control a switching frequency of the LLC resonant converter in response to the feedback signal, wherein the oscillator is coupled to decrease the switching frequency in response to an increase in load and increase the switching frequency in response to a decrease in load, wherein a programmable burst stop frequency of a burst mode of operation is responsive to the first or the second clamp signal being activated, wherein a programmable burst start frequency of the burst mode is responsive to the first and second clamp signals being deactivated.

10. The controller of claim 9 wherein the switching frequency during the burst mode of operation is a fraction of a maximum switching frequency of the LLC resonant converter.

11. The controller of claim 9 further comprising first and second drivers coupled to drive a half bridge circuit coupled to an LLC resonant circuit.

12. The controller of claim 9 wherein the feedback signal comprises a feedback current that is representative of the output of the LLC resonant converter.

13. The controller of claim 9 further comprising a maximum frequency sense block coupled to receive the maximum frequency signal, wherein the state machine is coupled to control the first, second and third current through the first, second and third fractional current mirrors, respectively, in response to the maximum frequency signal.

14. The controller of claim 13 wherein the maximum frequency sense block coupled to receive the maximum frequency signal through an external maximum frequency resistance such that the state machine is coupled to control the first, second and third current through the first, second and third fractional current mirrors, respectively, in response to the maximum frequency resistance.

15. The controller of claim 9 wherein the state machine comprises internal registers programmed to adjust fraction coefficient signals used to control the first, second and third current through the first, second and third fractional current mirrors, respectively.

16. The controller of claim 9 wherein the first and second fractional current mirrors comprise first and second pluralities of transistors coupled in parallel to provide the first and second currents, respectively, in response to the first and second fraction coefficient signals, respectively, received from the state machine.

17. The controller of claim 16 wherein the first and second pluralities of transistors comprise a plurality of NMOS transistors.

18. The controller of claim 9 wherein the third fractional current mirror comprises a third plurality of transistors coupled in parallel to provide the third current in response to a third fraction coefficient signal received from the state machine.

19. The controller of claim 18 wherein the third plurality of transistors comprises a plurality of PMOS transistors.

20. The controller of claim 9 further comprising an OR gate coupled to receive the first and second clamp signals, the OR gate coupled to activate a stop gate signal in response to the first or second clamp signals to stop switching of the LLC resonant converter.

21. The controller of claim 9 wherein the state machine is coupled to generate first, second and third fraction coefficient signals coupled to be received by the first, second and third fractional current mirrors, respectively, to control the first, second and third currents, respectively, wherein the first and second currents are fractions of the maximum frequency signal in response to the first and second fraction coefficient signals, and wherein the third current is a fraction of the feedback signal in response to the third fraction coefficient signal.

22. The controller of claim 9 wherein the first comparator is coupled to activate the first clamp signal if the feedback signal is greater than the first current.

23. The controller of claim 22 wherein a first input of the first comparator is coupled to be pulled towards a higher voltage than a first reference voltage coupled to a second input of the first comparator if the feedback signal is greater than the first current.

24. The controller of claim 9 wherein the second comparator is coupled to activate the second clamp signal if the third current is greater than the second current.

25. The controller of claim 24 wherein a first input of the second comparator is coupled to be pulled towards a higher voltage than a second reference voltage coupled to a second input of the second comparator if the third current is greater than the second current.

26. A method of controlling a resonant converter, comprising: switching the resonant converter at a switching frequency in response to a feedback signal to control a transfer of energy to an output of the resonant converter; decreasing the switching frequency as low as a minimum switching frequency in response to an increase in load at the output of the resonant converter; increasing the switching frequency as high as a maximum switching frequency in response to a decrease in load at the output of the resonant converter; switching the resonant converter at a burst mode frequency of a burst mode of operation of the resonant converter in response to a low load or no load condition at the output of the resonant converter, wherein the burst mode frequency is a fraction of the maximum switching frequency; wherein the burst mode frequency includes a burst start frequency and a burst stop frequency, wherein the burst start frequency is less than the burst stop frequency; wherein the burst start frequency and the burst stop frequency are fractions of the maximum switching frequency; and programming the burst stop frequency and the burst start frequency in response to the maximum switching frequency.

27. The method of claim 1 further comprising programming the burst stop frequency and the burst start frequency in response to programming internal registers of a state machine of a resonant converter controller of the resonant converter.

28. The method of claim 1 further comprising programming the burst stop frequency and the burst start frequency comprises programming currents through a plurality of fractional current mirrors.

29. The method of claim 28 wherein programming the currents through the plurality of fractional current mirrors comprises selectively activating or deactivating each of a plurality of transistors included in the plurality of fractional current mirrors.

30. The method of claim 26 further comprising programming the maximum switching frequency by selecting an external resistance circuit coupled to a maximum frequency pin of a resonant converter controller of the resonant converter.

* * * * *